United States Patent
Shortis

[19]
[11] Patent Number: 5,301,550
[45] Date of Patent: Apr. 12, 1994

[54] FLOAT FOR AN AUTOMOTIVE LIQUID LEVEL DETECTION DEVICE

[75] Inventor: Steven Shortis, Billercay, United Kingdom

[73] Assignee: Ford Motor Company, Dearborn, Mich.

[21] Appl. No.: 89,918

[22] Filed: Jul. 12, 1993

[30] Foreign Application Priority Data

Sep. 19, 1992 [GB] United Kingdom ............... 92/19838

[51] Int. Cl.5 .................... G01F 23/76; G01F 23/36
[52] U.S. Cl. ..................................... 73/322.5; 73/317
[58] Field of Search ............... 73/322.5, 317; 116/228, 116/229

[56] References Cited

U.S. PATENT DOCUMENTS

| | | | |
|---|---|---|---|
| 2,708,897 | 5/1955 | Dollar | 116/229 |
| 3,012,437 | 12/1961 | Clark et al. | 73/317 |
| 3,153,422 | 10/1964 | Marsee et al. | 73/322.5 |
| 3,316,763 | 5/1967 | DeGiers | 73/317 |
| 4,627,378 | 12/1986 | Manness et al. | 73/322.5 |
| 4,778,957 | 10/1988 | Crowell | 73/317 |
| 5,089,676 | 2/1992 | Duncan | 73/313 |

FOREIGN PATENT DOCUMENTS 289171 4/1928 United Kingdom .
1304684 1/1973 United Kingdom .

*Primary Examiner*—Diego F. F. Gutierrez
*Attorney, Agent, or Firm*—David B. Kelley; Roger L. May

[57] ABSTRACT

A float for a liquid level detection device has a shape with a flat surface which, when the float is in its lowermost position, will be horizontal (i.e., parallel to the liquid surface). The float has a center of buoyancy close to one edge of this face, and when the float is in its uppermost position the flat face will be generally vertical, with the edge of the face to which the center of buoyancy is closest being at the top. Because this edge is close to the center of buoyancy, only a small height of the float will project above the liquid level.

15 Claims, 3 Drawing Sheets

FLOAT FOR AN AUTOMOTIVE LIQUID LEVEL DETECTION DEVICE

FIELD OF THE INVENTION

This invention relates to a float for an automobile liquid level detection device. The liquid level detection device may be a liquid level gauge and, more particularly, the liquid level gauge may be a fuel level gauge for a motor vehicle fuel tank.

BACKGROUND OF THE INVENTION

Liquid level detection devices which use a float mounted on the end of a float arm, with the arm being pivoted to a fixed point, are well known. The buoyancy of the float causes it to float on the surface of the liquid and to rise or fall with the changing liquid level, resulting in rotational movement of the float arm about its pivot axis. Prior art floats have the disadvantage of not being able to accurately sense extreme fuel levels, that is, nearly full or nearly empty.

SUMMARY OF THE INVENTION

According to the present invention there is provided an improved float for a liquid level detection device able to sense fuel level conditions at extreme fuel levels. The float of the present invention has a substantially flat face and a center of buoyancy which is closer to one peripheral edge of the flat face than it is to an opposite edge thereof, and wherein means are provided for mounting the float in a fixed position on the end of a float arm so that when the float arm is in its lowermost position, the flat face is substantially horizontal and when the float arm is in its uppermost position, said one peripheral edge of the flat face is uppermost.

In a preferred form, the float is wedge-shaped and has a triangular cross-section in a plane perpendicular to the flat face. The triangular cross-section is preferably that of an isosceles triangle, with the base of the triangle being very much shorter than the two equal sides, and the flat face being one of the two equal sides. By 'flat' it is meant that the face has a major plane in which the face extends and that this plane will lie parallel to the liquid surface when the float is floating on the surface. Some parts of the surface may however lie outside this major plane but generally will not extend below the plane when the float is floating with the face downward.

With a float of this shape, when the float arm is in its lowermost position, the flat face floats on the liquid surface and the float therefore has a minimum immersed depth. The float can therefore follow the liquid level down to a position at which there is only a very small depth of liquid above the floor of a reservoir in which the liquid is contained.

On the other hand, because the center of buoyancy is close to the edge of the float which will be uppermost when the liquid level is near its maximum, the float will float in the liquid with its long dimension perpendicular to the liquid surface so that the height of that part of the float which lies above the liquid surface is a minimum.

The combination of these two features allows the float to follow the liquid level right down to the last remaining quantity in the reservoir, and also allows a top, enclosing wall of the reservoir to be only a small distance above the maximum liquid level in the reservoir.

In a second aspect of the invention, there is provided a liquid level detection device comprising a housing, a mechanism contained in the housing and a float arm pivoted to the housing, the float arm having mounted to its free end a float as set forth above, and the arm being associated with the mechanism in a manner such that pivoting movement of the arm results in operation of the mechanism.

The mechanism may for example be a valve which is operated to open or close the valve at a predetermined liquid level. Alternatively, the mechanism may be a fuel level gauge which produces a signal indicative of liquid level to a remote indicator device. In this latter embodiment, the liquid level detection device is particularly suitable for use as a fuel level indicator for a motor vehicle fuel tank.

DETAILED DESCRIPTION OF THE PREFERRED EMBODIMENT

Figure 1:
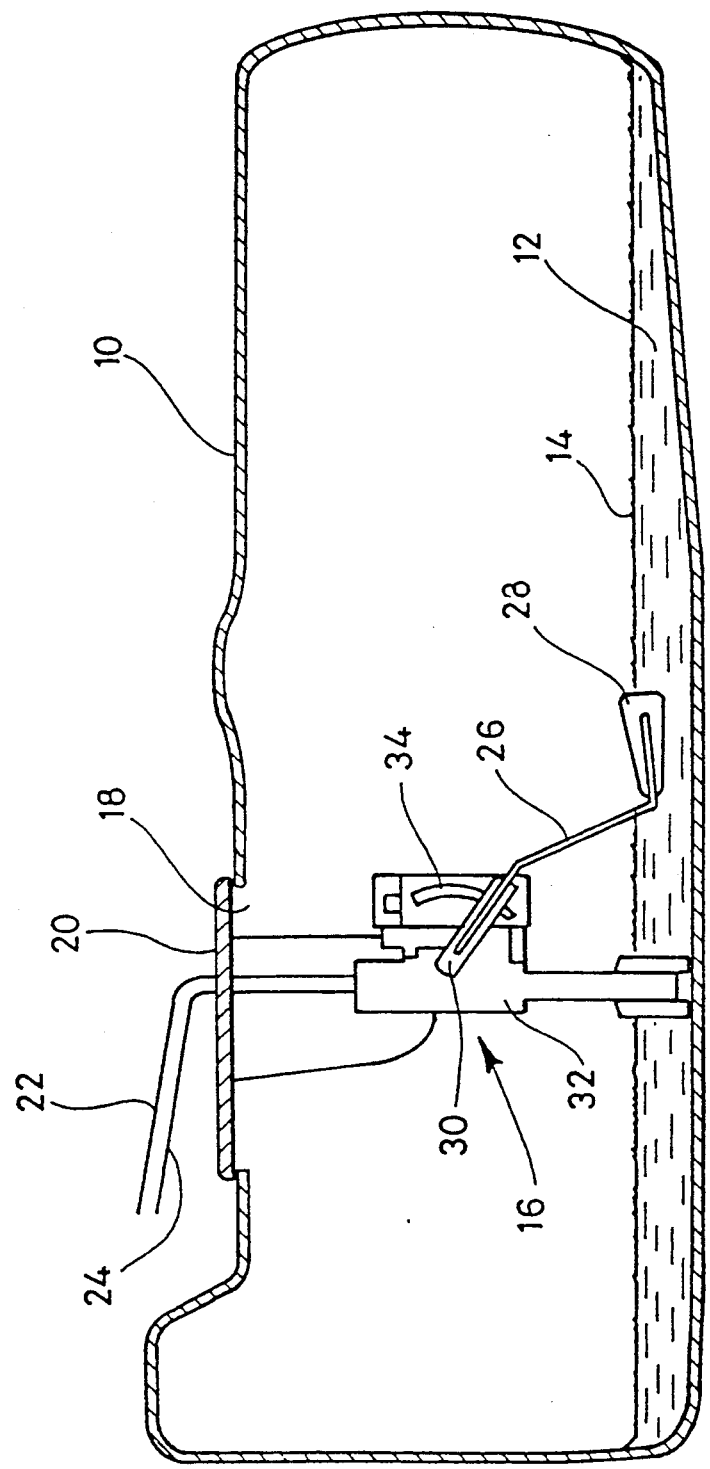
FIG. 1 shows a cross-section through a motor vehicle fuel tank which incorporates a liquid level detection device in accordance with the invention.

A fuel tank 10 shown in FIG. 1 contains liquid fuel 12 filled to the level of fuel surface 14. Located inside tank 10 is a fuel sender assembly 16 which is inserted into tank 10 through an opening 18 and depends from a closure plate 20. Electrical connections 22 and 24 extend out of the top of tank 10 and lead to a remote fuel level indicating device, for example a fuel gauge on a motor vehicle dashboard (not shown).

Fuel sender unit 16 comprises a float arm 26 with a float 28 at its free end. The other end of float arm 26 is pivoted at 30 to a housing 32, and float arm 26 carries an electrical contact (not shown in FIG. 1) which moves across a resistor track 34 which is secured to housing 32. The electrical signal produced in lines 22, 24 will vary in accordance with the position at which the contact touches resistor track 34 and as a result the remote indicator will show a reading which corresponds to the level of fuel in tank 10.

Float 28 floats on fuel surface 14. When tank 10 is refilled, float 28 will rise to near the top of tank 10, and as the fuel is consumed float 28 will follow the fuel level and gradually fall towards the bottom of tank 10.

Figure 2:
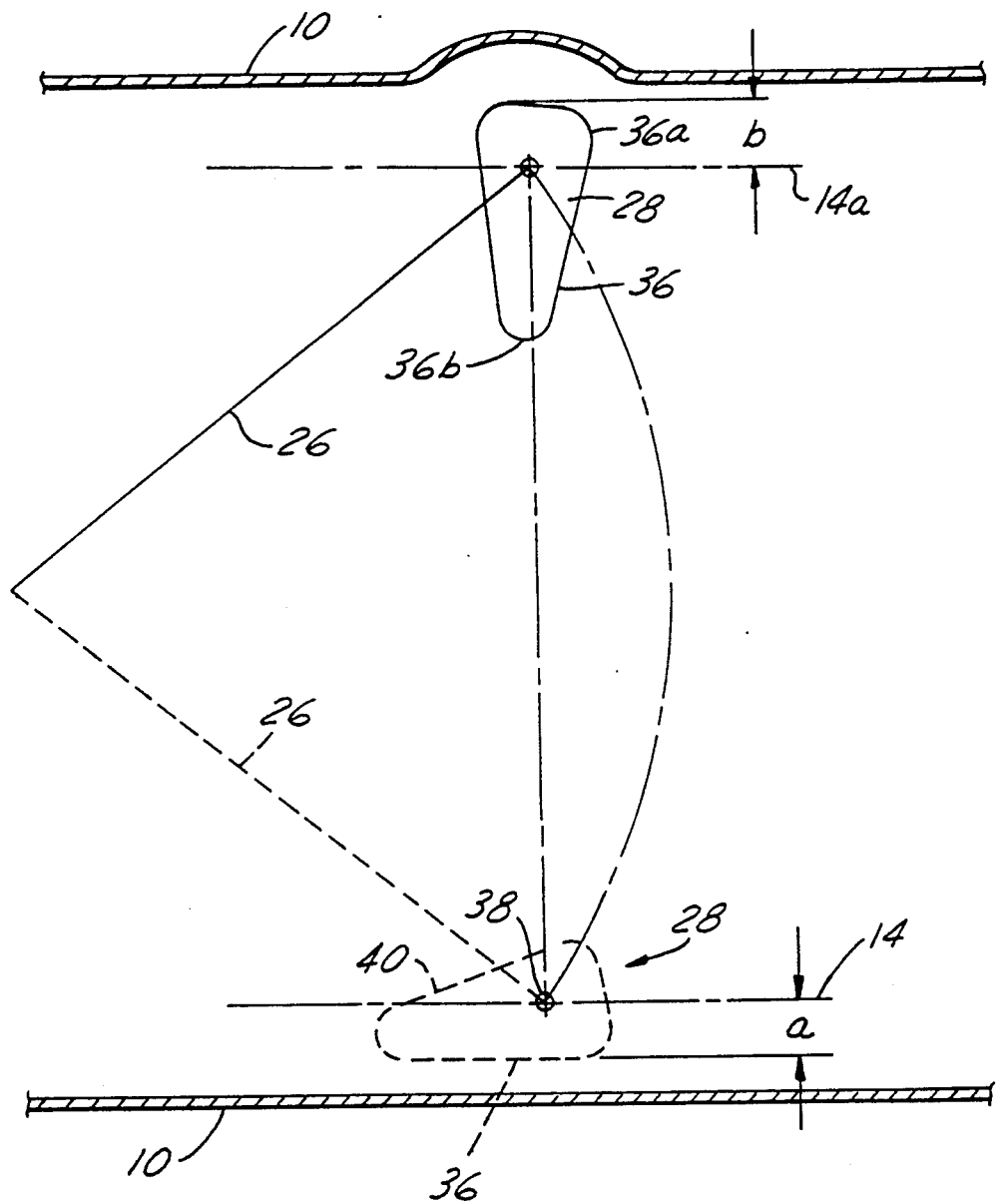
FIG. 2 schematically illustrates the range of movement of a float in accordance with the invention mounted on a float arm.

The shape of float 28 is significant to this invention. As can be seen in FIG. 2, float 28 is of a generally wedge-like shape and has one flat face 36. When float 28 is in its fully lowered position, flat face 36 will lie substantially horizontally so that the bottom of float 28 lies parallel with the fuel surface 14 and, in most cases, parallel with the bottom of tank 10. The center of buoyancy of float 28 is indicated at 38, and this point (in the embodiment shown) will lie on the fuel surface 14 with the result that the float 28 will be immersed to a distance a. The distance a is relatively small. When fuel level 14 rises to its upper level as indicated at 14a, float 28 will rise on the fuel surface. However because float 28 is rigidly attached in a fixed non-rotatable position to float arm 26, movement of float arm 26 from the lower position to the upper position will be accompanied by a rotation of float 28 and float arm 26. Float 28 will therefore lie with its major axis substantially vertical when it is in the upper position, and center of buoyancy 38, which is closer to edge 36a of face 36 than it is to opposite edge 36b, will result in the float projecting above the, liquid level by a distance b. Again, this distance b is relatively small. As a result the roof of tank 10 can be relatively close to the upper maximum fuel level 14a.

Figure 3:
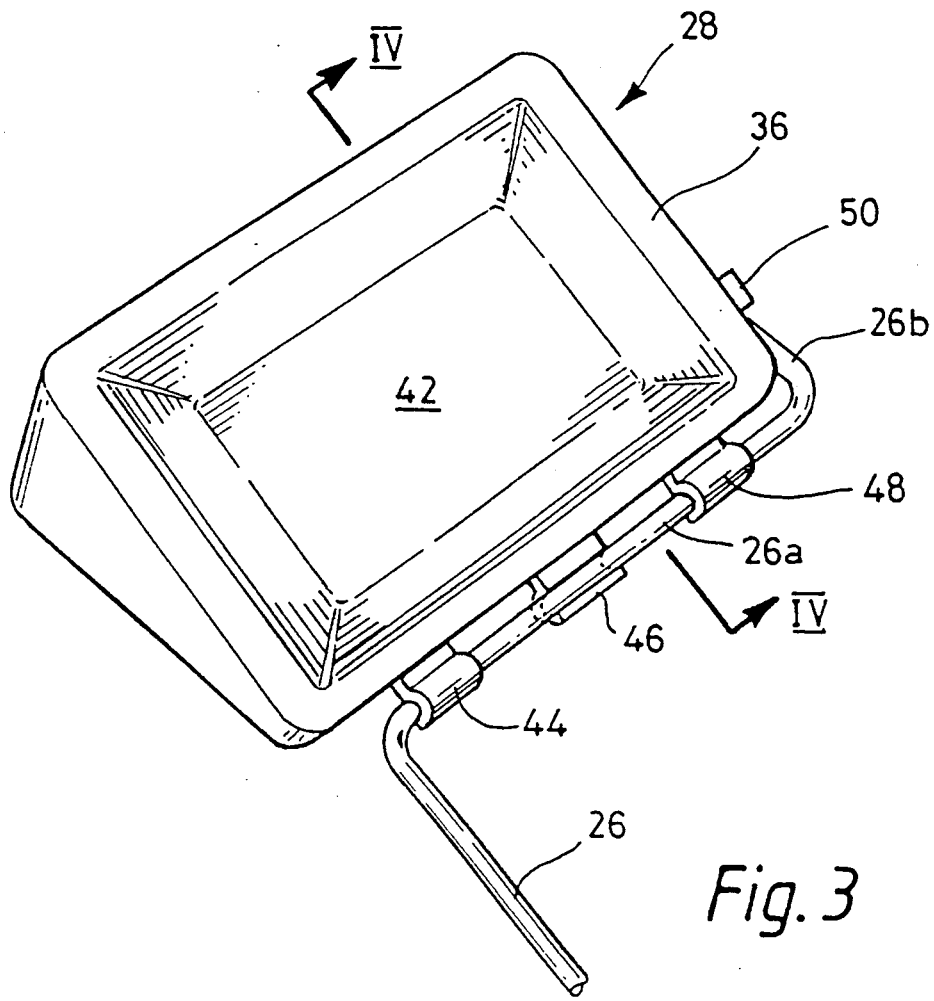
FIG. 3 is a perspective view of a float in accordance with the invention mounted on the end of a float arm.
Figure 4:
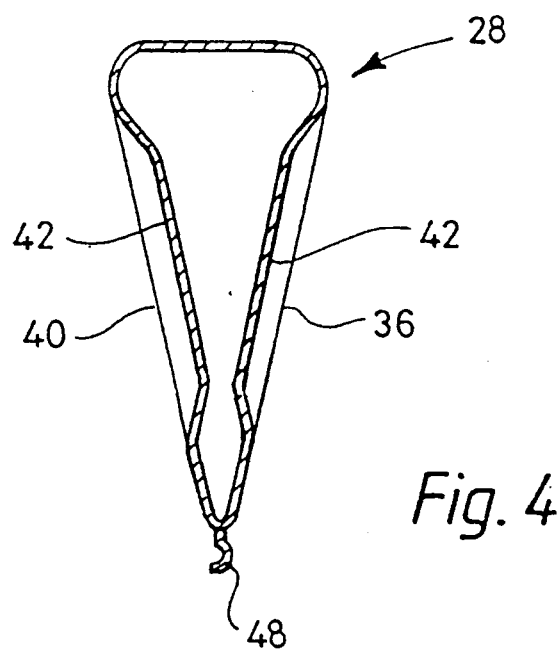
FIG. 4 is a cross-section through the float of FIG. 3 on the line IV—IV.

The construction of float 28 itself is shown in FIGS. 3 and 4. Float 28 is a hollow plastic piece made by blow molding, preferably of acetal resin which has particularly satisfactory resistance to motor vehicle fuel.

Float 28 shown in the drawings is symmetrical about a central plane so that it can be mounted with either of the major side faces 36 or 40 facing up without altering its function. If faces 36 and 40 of float 28 were molded in a flat condition, then there would be a likelihood that the faces would bow outward under certain conditions, particularly if the internally trapped gas expanded as a result of a temperature rise. In order to avoid such a condition, faces 36, 40 are blow molded with an inwardly dished central depression 42 as can be seen in FIGS. 3 and 4.

FIG. 3 also shows how float arm rod 26 is connected to float 28 without piercing the internal cavity of the float 28. Around the periphery of float 28, on two sides thereof, lugs 44, 46 and 48 are molded. Lugs 44 and 48 are open in one direction and lug 46 between them is open in the opposite direction, so that float arm 26 can be snapped in and held between these three lugs. An arrangement of three lugs is also provided on the right hand end (viewed in FIG. 3) of float 28. These lugs (only one of which can be partly seen at 50 in FIG. 3) are shaped so that float arm 26 has to be axially inserted into the lugs. Because float arm 26 is secured to float 28 on limbs 26a and 26b of float arm 26, these limbs being at right angles to one another, float arm 26 is firmly secured to the float 28.

Although the preferred embodiments of the present invention have been disclosed, various changes and modifications may be made without departing from the scope of the invention as set forth in the appended claims.

I claim:

1. A float for a liquid level detection device comprising:
    a substantially flat face on a side of said float;
    a center of buoyancy closer to a peripheral edge of said flat face than to an opposite edge of said flat face; and
    mounting means for mounting said float in a fixed non-rotatable position on an end of a float arm so that when said float arm is in a lowermost position, said flat face is substantially horizontal, and when said float arm is in an uppermost position, said peripheral edge of said flat face is uppermost with respect to said opposite edge, such that said float senses fuel level in said tank at nearly full and nearly empty conditions.

2. A float according to claim 1 wherein said float is wedge-shaped and has a triangular cross-section in a plane perpendicular to said flat face.

3. A float according to claim 2 wherein said triangular cross-section is that of an isosceles triangle, said isosceles triangle having a base substantially shorter than two equal sides of said isosceles triangle, and said flat face being one of said two equal sides.

4. A float according to claim 3 wherein said float is produced by blow-molding.

5. A float according to claim 4 wherein said flat face of said float is inwardly dished.

6. A float according to claim 5 wherein said float is made of acetal resin.

7. A float according to claim 6 wherein said mounting means comprises peripheral, integrally molded lugs into which a float arm can be snap-fitted.

8. A liquid level detection device comprising a housing, a sensing mechanism contained in said housing and a float arm pivoted to said housing, said float arm having a float mounted to its free end, said float arm being associated with said sensing mechanism in a manner such that pivoting movement of said float arm results in operation of said mechanism, said float comprising:
    a substantially flat face on a side of said float;
    a center of buoyancy closer to a peripheral edge of said flat face than to an opposite edge of said flat face; and
    mounting means for mounting said float in a fixed non-rotatable position on an end of a float arm so that when said float arm is in a lowermost position, said flat face is substantially horizontal, and when said float arm is in an uppermost position, said peripheral edge of said flat face is uppermost with respect to said opposite edge.

9. A liquid level detection device according to claim 8, wherein said mechanism is a fuel level sensing means which produces a signal indicative of liquid level to a remote indicator device.

10. A liquid level detection device according to claim 9 wherein said float is wedge-shaped and has a triangular cross-section in a plane perpendicular to said flat face.

11. A liquid level detection device according to claim 10 wherein said triangular cross-section is that of an isosceles triangle, said isosceles triangle having a base substantially shorter than two equal sides of said isosceles triangle, and said flat face being one of said two equal sides.

12. A liquid level detection device according to claim 11 wherein said float is produced by blow-molding.

13. A liquid level detection device according to claim 12 wherein said flat face of said float is inwardly dished.

14. A liquid level detection device according to claim 13 wherein said float is made of acetal.

15. A liquid level detection device according to claim 14 wherein said mounting means comprises peripheral, integrally molded lugs into which a float arm can be snap-fitted.

* * * * *